(12) United States Patent
Yamazaki

(10) Patent No.: US 6,480,625 B1
(45) Date of Patent: Nov. 12, 2002

(54) METHODS FOR CORRECTING DENSITY CHARACTERISTIC AND COLOR

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/353,442

(22) Filed: Jul. 14, 1999

(30) Foreign Application Priority Data

Jul. 14, 1998 (JP) ............................................ 10-198544
Jul. 16, 1998 (JP) ............................................ 10-202156

(51) Int. Cl.⁷ ................................................ G06K 9/00
(52) U.S. Cl. ........................ 382/167; 382/274; 358/518; 358/461
(58) Field of Search ................................ 382/167, 274, 382/312; 358/518, 461; 399/9, 39, 59, 60

(56) References Cited

U.S. PATENT DOCUMENTS 5,313,291 A * 5/1994 Appel et al. ................ 358/501
5,835,235 A * 11/1998 Goto et al. .................. 358/406
6,046,820 A * 4/2000 Konishi ....................... 358/1.9
6,271,933 B1 * 8/2001 Asai et al. ................... 358/1.2

* cited by examiner

*Primary Examiner*—Yon J. Couso
(74) *Attorney, Agent, or Firm*—Sughrue Mion, PLLC

(57) ABSTRACT

These methods for correcting density characteristic and color store previously a reference measured value obtained by measuring a reference original with a reference measuring instrument, read the same reference original with an image reading apparatus which is a target to be corrected, compare an statistic obtained by analyzing the thus read value with the stored reference measured value and calculate at least one of an input density characteristic correction parameter and an input color correction parameter, based on the obtained result. As a result, these methods can suitably correct the unevenness of the various characteristics, the unevenness of the spectral sensitivity or both of the image reading apparatus (scanner) caused by light sources, optical filters, image sensors or the like and perform the correction of the density characteristic which is a basis of an appropriate color reproduction in accordance with the original image, the color correction for obtaining a constant color reproduction or both.

32 Claims, 9 Drawing Sheets

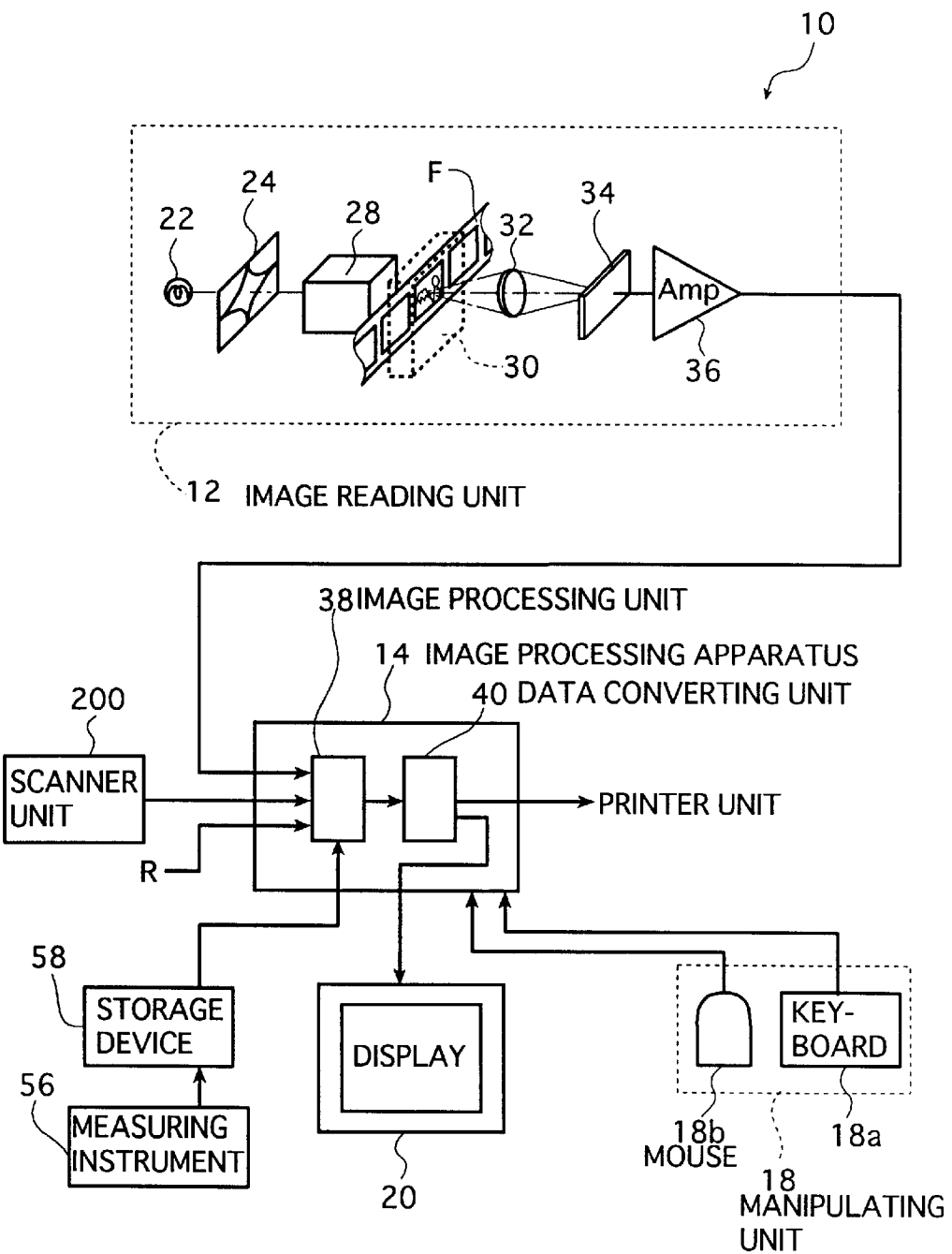

FIG. 9
(a)
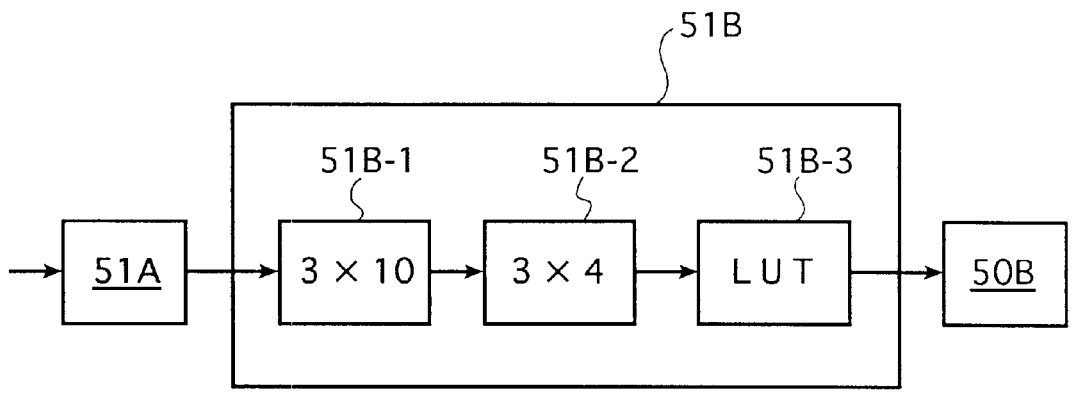
(b)
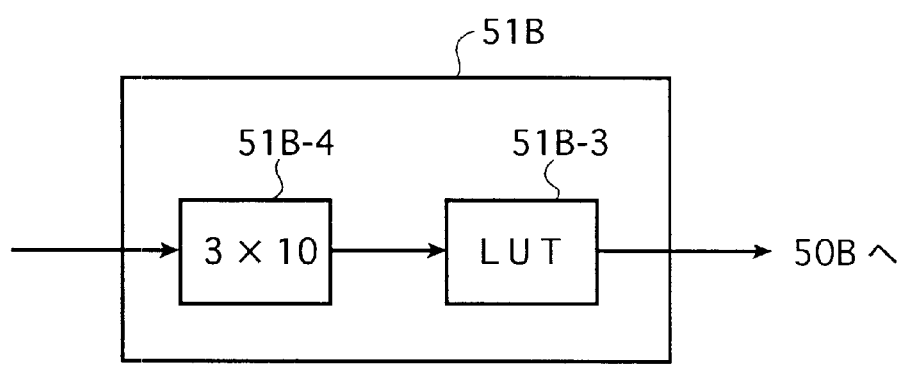
(c)
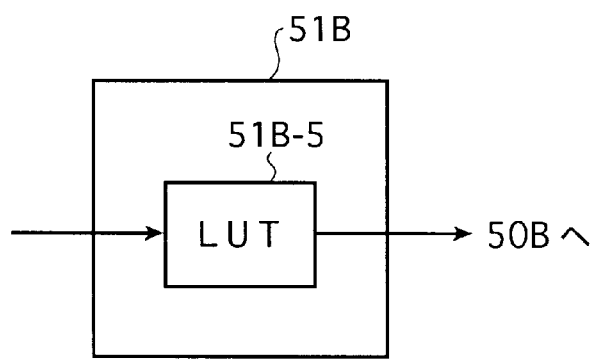

METHODS FOR CORRECTING DENSITY CHARACTERISTIC AND COLOR

BACKGROUND OF THE INVENTION

This invention relates to the technical field of density correction that will be a basis of performing an appropriate color reproduction in accordance with an original image and color correction which is capable of obtaining the appropriate color reproduction by correcting unevenness of spectral sensitivity characteristic and other various characteristics of an image reading apparatus (scanner) when the original image is photoelectrically read.

At present, most of the images recorded on photographic films such as negatives and reversals (which are hereinafter referred to as "films") are printed onto light-sensitive materials (photographic papers) by a technique generally called "direct exposure" (analog exposure) in which the light-sensitive materials are exposed with the light projected from the films.

Reflection original such as printed matters, photographs or the like have also commonly been reproduced by means of analog exposure.

For the former case, printing apparatus which adopt digital exposure have recently been commercialized. In this "color digital printer", the image recorded on a film is read photoelectrically and converted into digital signals, which are subjected to various kinds of image processing to produce recording image data; a light-sensitive material is scanned and exposed with recording light modulated in accordance with the image data, thereby recording a (latent) image which is then made to a (finished) print (photograph).

Also for the latter case, an apparatus employing a digital system has been commercialized as in a same manner as in the former case. Moreover, in the above-mentioned color digital printer, a so-called composite printer which can produce a copy (print) from the reflection original such as a printed matter, a photography or the like has recently been commercialized.

This composite printer is basically composed of a transparent original reading scanner for photoelectrically reading an image recorded on a film with an image sensor, a reflection original reading scanner for photoelectrically reading an image recorded on the reflection original such as a printed matter, a photograph or the like with an image sensor, an image processing apparatus for subjecting the image data read with those scanners or image data supplied from a digital camera or the like to preset image processing and making the image data to image data for recording the image, that is, setting an exposure condition based on the image data, a printer (image recording apparatus) for recording a latent image by scanning and exposing a light-sensitive material with, for example, a light beam scanning in accordance with the image data outputted from the image processing apparatus and a processor (developing apparatus) for subjecting the light-sensitive material having been exposed with the printer to development processing and for outputting a print on which the image is reproduced.

In such a composite printer, since the image can be read as digital image data and the exposure condition used in printing can be determined by subjecting the digital image data to image processing, a print of high quality which can not be obtained by the conventional direct exposure can be obtained, for example, from the image on the negative film, by properly executing the correction of a washed-out highlight and a dull shadow due to photography with back light or an electronic flash, sharpening processing and the like.

Moreover, a plurality of images can be composited to a single image or one image can be split into segments through the image data processing. As a result, prints can be outputted after images are freely subjected to editing and processing in accordance with applications.

Further, also as to the image of the reflection original, various image processing can be performed to produce a high-quality print.

In the transparent original reading scanner or the reflection original reading scanner of the above composite printer, reading light is incident on an original, and projected light which has passed through the original (film) or reflected light which has been reflected from the original printed matter), is read with an image sensor such as a CCD sensor or the like thereby photoelectrically reading an original image.

In the case of a color original, the projected light or the reflected light of the original is processed with red (R), green (G) and blue (B) color filters or the reading light processed with the R, G, and B color filters is incident on the original, whereby the original image is read by being separated into the three primary colors R, G and B.

In the above situation, when scanners of the same type read the same original, they must obtain the same image signals (image data).

However, instrumental errors exist in light sources, color filters, image sensors and the like which are mounted on scanners. As a result, these scanners have different spectral sensitivity characteristics each other even if they are of the same type. Accordingly, since resultant image signals are influenced by the spectral sensitivity characteristic of each scanner, images having different color tints are produced with each scanner even if visible images are reproduced using the image signals. Thus, appropriate colors can not be always reproduced in accordance with the original, that is, an image of high-quality can not be always reproduced.

Similar problem exists with density. Even in a monochrome image, since the instrumental errors exist in light sources and image sensors installed in the scanner from one another, the image signals to be obtained differ from one scanner to another scanner so that an appropriate density can not be always reproduced in accordance with the original.

SUMMARY OF THE INVENTION

A first object of the invention is to solve the above problems of the prior art and to provide a method for correcting a density characteristic which will be a basis of performing an appropriate color reproduction in accordance with an original image by correcting unevenness of various characteristics of a scanner caused by a light source, an optical filter, an image sensor or the like and reading errors caused by this unevenness.

A second object of the invention is to solve the above problems of the prior art and to provide a method for correcting a color which is capable of obtaining a constant color reproduction by suitably correcting the unevenness of spectral sensitivity of the scanner caused by the light source, the color filter, the image sensor or the like and the reading errors caused by this unevenness.

In order to attain the above-described first object, a density characteristic correcting method according to a first aspect of the invention comprises: a first step of measuring a reference original with a preset measuring instrument to obtain a measured result and storing the thus obtained measured result in a storing means; a second step of reading the reference original with an image reading apparatus (scanner) which is a target to be corrected and obtaining a statistic by analyzing image signal values in a preset position within an image region of the reference original; a third step of reading out the measured result stored in the storing means; and a fourth step of calculating an input density characteristic correction parameter from the static obtained by the second step and the measured result read by the third step.

It is preferable that the density characteristic correcting method according to the invention creates a shading correction parameter before reading in the second step is performed and uses the thus created shading correction parameter when the reading in the second step is performed.

It is also preferable that in the density characteristic correcting method according to the invention, the image signal values obtained by measuring the reference original with the preset measuring instrument and a position information thereof are stored in the storing means as the measured result.

Moreover, it is further preferable that the input density characteristic correction parameter in the density characteristic correcting method according to the invention is a lookup table (LUT) which is determined such that an error between the measured result obtained in the first step and the statistic obtained in the second step is minimized.

The image signal value preferably has a higher resolution of bits than an image signal value for generally forming an image has and it is preferable that the measured result includes a measured value and a position thereof and that the measured value is any one of status M density (printing density), status A density (colorimetric density), R, G and B values measured on the basis of X, Y and Z colorimetric values and the image signal value by an reference input device (scanner). The statistic is preferably a mean value or a median value within a preset region. Calculation of the lookup table (LUT) is preferably to calculate a polynomial approximate expression so as to use a polynomial coefficient thereof as a parameter. It is preferable that, when an error minimization operation is executed, weighting is performed putting importance on a lower density. It is preferable that the reference original spectrally has a nearly flat characteristic and that it is an ND filter for the transparent original scanner and a color chart such as a gray patch or a gray chart for the reflection original scanner. Moreover, the reference original preferably includes a low density portion (density of 0.2 or less). The reference original preferably includes a high density portion (density of 2.5 or more for transparent original; and density of 1.5 or more for reflection original).

In order to attain the above-described second object, a color correcting method according to a second aspect of the invention comprises:a first step of measuring a reference original with a preset measuring instrument and then storing the thus obtained measured result in a storing means; a second step of reading the reference original with an image reading apparatus (scanner) which is a target to be corrected and obtaining a statistic by analyzing image signal values in a preset position within an image region of the reference original; a third step of reading out the measured result stored in the storing means; and a fourth step of calculating an input color correction parameter from the statistic obtained in the second step and the measured result read in the third step.

It is preferable that the color correcting method according to the invention creates a shading correction parameter before reading in the second step is performed and uses the thus created shading correction parameter when the reading in the second step is performed, and that the color correction method creates an input density correction parameter for an original which spectrally has a nearly constant reflectance transmittance before reading with the image reading apparatus in the second step is performed thereby using the thus created input density correction parameter when the reading in the second step is performed.

Moreover, it is also preferable that in the color correcting method according to the invention, the image signal values obtained by measuring the above-mentioned reference original with a preset measuring instrument and position information thereof are stored in the above-mentioned storing means as the measured result.

Furthermore, it is further preferable that in the color correcting method according to the invention, calculation of the input color correction parameter in the fourth step comprises the steps of:selecting a parameter which has a smallest error from among previously obtained candidate parameters; calculating a correction parameter which minimizes an error amount to be generated from the thus selected parameter; and combining the selected parameter and the thus calculated correction parameter.

It is still further preferable that as the reference original, a same kind of reference original as that of the original which is the target to be read is used.

One-dimensional LUT (lookup table) is preferably calculated by targeting only an achromatic color within the reference original so as to absorb an error between a measured value of the reference original and a correction value obtained by the above-calculated parameter. It is preferable that in the calculation of one-dimensional LUT, a polynomial approximate expression is calculated and an approximation coefficient thereof is used as a parameter. It is preferable that the candidate parameter is a quadratic matrix coefficient; the calculation correction parameter is a linear matrix coefficient; and the color correction parameter is the quadratic matrix. It is preferable that the quadratic matrix of the color correction parameter is expanded into a three-dimensional LUT (lookup table) (by CPU or the like) which is then used as the color correction parameter. This three-dimensional LUT and the one-dimensional LUT are preferably combined to be another three-dimensional LUT which is then used as the color correction parameter.

The image signal value preferably has a higher bit resolution than an image signal value for generally forming an image has. It is preferable that the measured result includes the measured value and a position thereof and that the measured value is any one of status M density (printing density), status A density (colorimetric density), R, G and B values measured on the basis of the X, Y and Z colorimetric values and the image signal value by an reference input device (scanner). The statistic is preferably a mean value or a median value within a preset region. It is preferable that an input color correction (separation) parameter is calculated using the reference original coincided with (the type of) the target to be read. In other words, it is preferable that input color correction (separation) parameters are calculated using associated reference originals:the reference original of a negative film when the negative film is read; the reference original of a reversal film when the reversal film is read; the reference original of a photograph when the photograph original is read; and the reference original of a printed matter when the printed matter is read.

In each of above aspects, a plurality of reference originals may be used as the above-mentioned reference original.

In this case, it is preferable that a number of the above plurality of reference originals and an order thereof to be used are previously determined, the measured results corresponding to the above-mentioned plurality of reference originals are stored in the above-mentioned storing means in the thus determined number and order to be used, the stored measured result corresponding to the reference original is read out from the above-mentioned storing means in the above-mentioned previously determined order to be used, as well as the above-mentioned statistic is obtained by reading the above-mentioned corresponding reference original in accordance with the above-mentioned previously determined order to be used by means of the above-mentioned image reading apparatus, the obtained statistic and the above-mentioned read-out corresponding measured result are sequentially accumulated in the previously determined order, and, after the above-mentioned statistics and the above-mentioned measured results corresponding to the above-mentioned previously determined number of reference originals are obtained, at least one of the above-mentioned input density characteristic correction parameter and the above-mentioned input color correction parameter is calculated. It is preferable herein that, before the above-mentioned reference originals is used, the above-mentioned plurality of reference originals and the order thereof to be used are displayed and notified outside.

Moreover, it is preferable that a number of the above-mentioned plurality of reference originals and an order thereof to be used as well as measured results corresponding to these plurality of reference originals are stored previously in the above-mentioned storing means, the number and the order to be used of the above-mentioned plurality of reference originals are read out by a control means; the above plurality of reference originals to be used and the order thereof to be used are displayed to be notified outside, the above-mentioned measured result corresponding to the reference original is read from the above-mentioned storing means in the above-mentioned order to be used, as well as the above-mentioned statistic is obtained by reading the above-mentioned corresponding reference originals in accordance with the above-mentioned order to be used by means of the above-mentioned image reading apparatus; the obtained statistic and the above-mentioned read out corresponding measured result are sequentially accumulated in the order to be used, and, after the above-mentioned statistics and measured results corresponding to the above-mentioned read-out number of reference originals are obtained, at least one of the above-mentioned input density characteristic correction parameter and the above-mentioned input color correction parameter is calculated.

Further, it is preferable that the measured results corresponding to the plurality of reference originals in which the measured results are correlated with the reference originals are stored in the storing means, an information of the of the reference original to be used is obtained, the measured result corresponding to the reference original is read out from the storing means, as well as the statistic is obtained by reading the reference original to be used with the image reading apparatus, the thus obtained statistic and the read-out corresponding measured result are sequentially accumulated, and at least one of the input density characteristic correction parameter and the input color correction parameter from the accumulated statistics and the accumulated measured results.

In this case, it is preferable that the information of the reference original to be used is inputted from outside with a information inputting means and that at least one of the input density characteristic correction parameter and the input color correction parameter is calculated based on a calculating instruction of the correction parameter which is inputted with the information input means from outside Furthermore, it is preferable that the above-mentioned reference original is provided with a bar code, this bar code is read by a bar code reader, and the above-mentioned measured result is read from the above-mentioned storing means in accordance with the read bar code.

It is also preferable that an information representing the above-mentioned measured result corresponding to the reference original and, optionally, a presence or absence of calculation of at least one of the above-mentioned input density characteristic correction parameter and the above-mentioned input color correction parameter are recorded on a portion of the above-mentioned reference original using at least one of a numeral, a patch density, a pattern and a bar code, the above-mentioned measured result information and, optionally, the presence or absence of the calculation of the above-mentioned correction parameter are read as an image information at the same time when the above-mentioned reference original is read with the above-mentioned image reading apparatus, the above-mentioned read image information is analyzed and judged, and the above-mentioned corresponding measured result is read, optionally the above-mentioned presence or absence of the calculation is read and the above-mentioned corresponding measured result is accumulated in case of the above-mentioned absence of the calculation while at least one of the above-mentioned input density characteristic correction parameter and the above-mentioned input color correction parameter is calculated in case of the above-mentioned presence of the calculation.

BRIEF DESCRIPTION OF THE DRAWINGS

FIG. 3 is a block diagram illustrating an embodiment of a film scanning unit shown in FIGS. 1 and 2;

FIGS. 9A, 9B and 9C are diagrams showing an internal structure of an embodiment of a color correcting subsection in the image processing apparatus shown in FIG. 7, respectively.

DETAILED DESCRIPTION OF THE INVENTION

The density characteristic correcting method and color correcting method according to the invention will be described in detail with reference to preferred embodiments shown in the accompanying drawings.

At first, the method for correcting the density characteristic and the color digital printer applying this method according to the first aspect of the invention will now be described with reference to FIGS. 1 to 6B.

Figure 1:
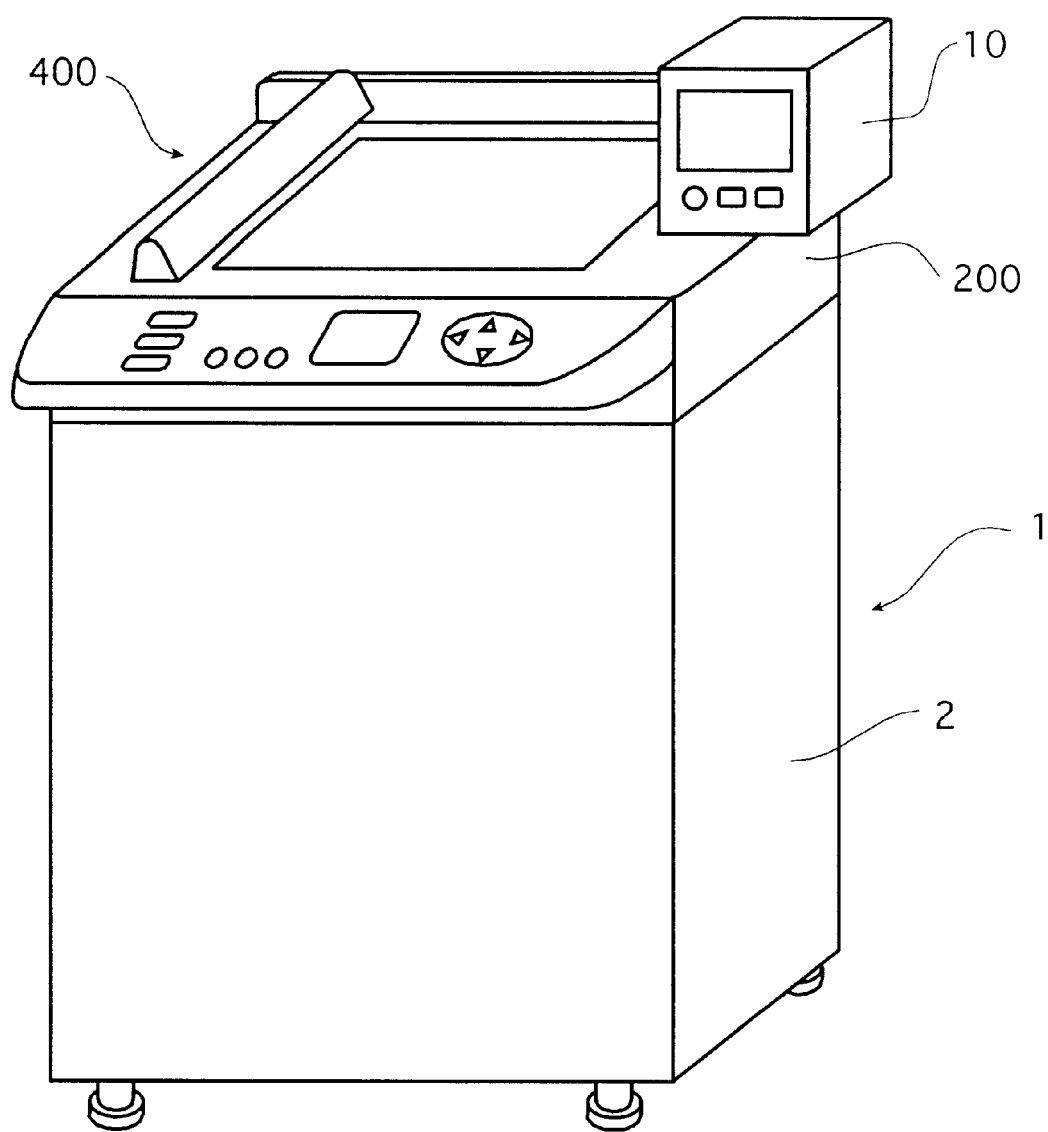
FIG. 1 is a perspective view showing an exterior of a color digital printer according to an embodiment of the invention.

FIG. 1 is a perspective view showing an exterior of a color digital printer of an embodiment performing the density characteristic correcting method according to the first aspect of the invention.

The color digital printer 1 according to the present embodiment is constructed in a box form as a whole, with a scanner unit 200 for reading a reflection original being provided on an upper portion of a body thereof and a film scanning unit 10 for copying a small-size transparent original such as a color negative film, a slide or the like of, say, 135 size or 240 size being removably attached thereto at a position adjacent to the scanner unit 200. When a relatively large-size transparent original such as a slide, a proof or the like of 4×5 size is copied or transparent originals such as a plurality of sleeves are placed in rows to be copied, a light source device 400 for copying the transparent original is placed in a preset position on an upper surface of the scanner unit 200. The detailed configuration is shown in FIG. 2.

Image signals read with the scanner unit 200 for copying the above-mentioned reflection original or with the scanner unit 200 provided with the light source device 400 for copying the transparent original and image signals read with a film scanning unit 10 are subjected to a preset image processing at the image processing apparatus, as described later, along with image data from an image data supplying device such as a digital camera or the like.

Figure 2:
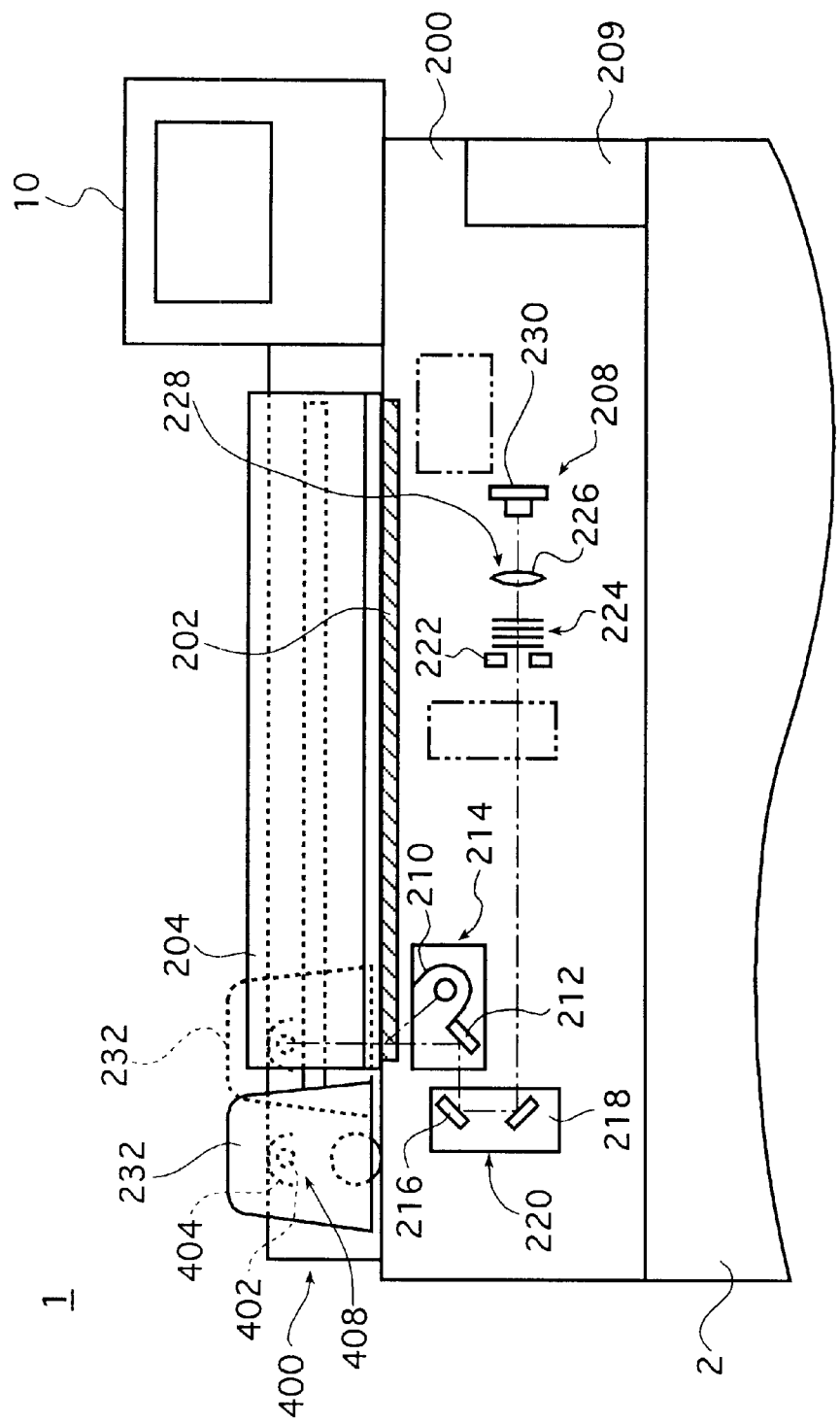
FIG. 2 is a diagram showing an internal structure of an embodiment of a scanner unit in FIG. 1.

In the lower portion denoted as the reference numeral 2 in FIGS. 1 and 2 of the body of the color digital printer 1, a printer unit which exposes a light-sensitive material (photographic paper) based on image printing (exposing) information to be outputted from the above-mentioned image processing apparatus and a processor unit which develops the exposed photographic paper are installed. The color digital printer 1 of the present embodiment uses, as a recording material, the light-sensitive material which has a thermal developing process and is capable of forming images by a transfer method onto an image receiving material having an image receiving layer under the existence of an image forming solvent such as water or the like and can print, as an original, the reflection original such as a printed matter, a photograph or the like, as well as the transparent original such as a slide, a proof, a color negative film or the like of 135 or 240 size.

The film scanning unit 10 will now be described.

FIG. 3 shows a block diagram of the film scanning unit 10. The film scanning unit 10 comprises an image reading unit 12 which reads an image recorded on a film F photoelectrically and an image processing apparatus 14 which performs processing of an image data, manipulation and control of the photoprinter in its entirety.

Connected to the image processing apparatus 14 are an image reading unit 12, a scanner unit 200 which will be described later, other image data supplying source R than these apparatuses, a manipulating unit 18 having a keyboard 18a and a mouse 18b to enter or set various conditions, to select and issue a command for a specific processing step and to enter commands for color/density correction and the like, as well as a display 20 which displays the image read with the image reading unit 12, various kinds of manipulative instructions, and screens on which various conditions are set and/or registered.

The image reading unit 12 is a unit for reading the image recorded on the film F or the like photoelectrically frame by frame. It comprises a light source 22, a variable diaphragm (stop) 24, a diffuser box 28 with which the reading light incident on the film F is rendered uniform in a plane direction of the film F, an imaging lens unit 32, an image sensor 34 which has line CCD sensors corresponding to the reading of respective R (red), G (green) and B (blue) images and an amplifier 36.

The image reading unit 12 has dedicated carriers 30 available which can be selectively mounted on the body of the image reading unit 12 depending upon such factors as the type and size of films, for examples, films for an Advanced Photo System (hereinafter called as APS) and negatives (or reversals) of 135 size, the physical form of the films, e.g. whether they are a strip or a slide. By changing carriers 30, the image reading unit 12 is capable of handling and processing various kinds of films. An image (frame) which is recorded on a film and used to produce a print is transported to a preset reading position by the carrier 30.

As is well known, on the APS film, a magnetic recording medium is formed where data such as cartridge ID, film type and the like are recorded and, moreover, various kinds of data such as photographing date and time, a position information of a principal portion, a type of a developing apparatus and the like are capable of being recorded when pictures are taken or development is performed. A reading device for reading these magnetic information is provided in the carrier 30 corresponding to the APS film (cartridge) so that, when the film is transported in a reading position, the reading device reads these magnetic information and outputs various kinds of the thus read information to the image processing apparatus 14.

In the image reading unit 12, the reading light emitted from the light source 22 is adjusted in quantity through the variable diaphragm 24, is incident on the film F which is held at a preset reading position by the carrier 30 and passes through the film F to produce a projected light which carries the image recorded on the film F.

The carrier 30 is adapted to a lengthy film F (strips), such as a film of 135 size with 24 photographing frames, a cartridge of APS film or the like. As illustrated schematically in FIG. 4A, the carrier 30 includes a pair of transport roller pairs 30a and 30b and a mask 26 having a slit 26a. The transport roller pairs 30a and 30b are disposed on the opposite sides of a preset reading position in an auxiliary scanning direction. They transport the film F with its length being parallel to the auxiliary scanning direction which is perpendicular to a direction in which the line CCD sensors of the image sensor 34 extend (main scanning direction) while holding the film F at the preset reading position. The slit 26a defines the light projected from the film F so that the light has a preset slit shape, is located in registry with the reading position and extends in the main scanning direction.

Being held at the reading position by the carrier 30, the film F is illuminated with the reading light which is incident thereon while transported in the auxiliary scanning direction. Consequently, the film F is subjected to two-dimensional slit scan with the reading light through the slit 26a extending in the main scanning direction, whereupon the image (original image) of each frame recorded on the film F is read.

The projected light from the film F is focused by the imaging lens unit 32 to form a sharp image on the light-receiving plane of the image sensor 34.

Figure 4A:
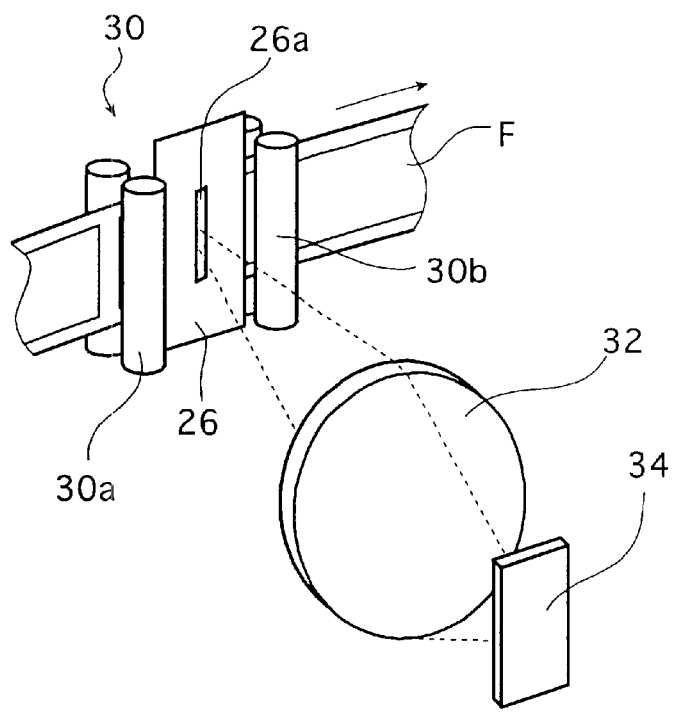
FIG. 4A is a conceptual view illustrating an embodiment of a carrier set to the film scanning unit shown in FIG. 3.
Figure 4B:
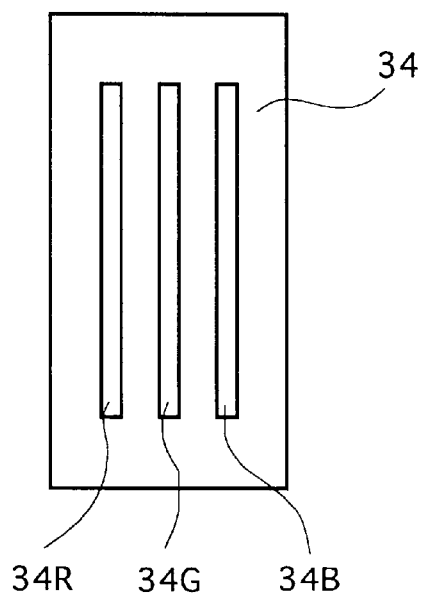
FIG. 4B is a conceptual view illustrating an embodiment of an image sensor set to the film scanning unit shown in FIG. 3.

As shown in FIG. 4B, the image sensor 34 is a so-called 3-line color CCD sensor comprising a line CCD sensor 34R for reading R image, a line CCD sensor 34G for reading G image and a line CCD sensor 34B for reading B image. The respective line CCD sensors extend in the main scanning direction as described above. The light projected from the film F is separated into three primary colors R, G and B by means of the image sensor 34 and read photoelectrically.

The output signals from the image sensor 34 is amplified with the amplifier 36 to be sent to the image processing apparatus 14.

Next, turning back to FIG. 2, the scanner unit 200 is described with reference to the figure.

The scanner unit 200 is covered with a casing in a box form. A rectangular opening is provided in the middle portion of the upper surface of the casing and a platen glass 202 is fitted in the rectangular opening. The platen glass 202 functions as a flat platform to place an original thereon on which a reflection original or a transparent original recorded with a flat image is to be placed. A pressing-down cover 204 which is capable of opening and closing is provided on the platen glass 202.

In the transparent original scanner unit 232 of the light source device 400 for copying the transparent original, a transparent original light source unit 408 having a halogen lamp as a light source 402 and a reflector 404 is disposed. The transparent original light source unit 408 is arranged such that it irradiates a light in a width direction of the platen glass 202 (in a direction from the front to the rear in FIG. 2) which is the main scanning direction when the transparent original is placed on the platen glass 202. In the light source device 400, the transparent original scanner unit 232 moves in the auxiliary scanning direction on the platen glass 202 to scan the transparent original placed on the platen glass 202 two-dimensionally by means of the transparent original light source unit 408.

In the front side of the upper surface of the casing of the scanner unit 200, a manipulation/display panel (not shown) is disposed so that the display or the like of commands of various kinds of functions or an operational condition in the apparatus can be executed.

In the scanner unit 200, a scanning section 208 is provided. The scanning section 208 is controlled by a controller 209. The scanning section 208 comprises a reflection original light source unit 210 having a halogen lamp which extends in the width direction (main scanning direction) of the original image and a reflector, a first carriage 214 which is assembled with a first mirror 212 that extends in the width direction of the original image together with the reflection original light source unit 210, a second carriage 220 which is assembled with a second mirror 216 and a third mirror 218, and a fixing unit 228 constructed with a diaphragm 222, a cluster of filters 224 which is composed of four filters such as a color adjusting filter, an ND filter and the like and an imaging lens 226.

The first carriage 214 serves in a manner that light from the reflection original light source unit 210 irradiates the original placed on the platen glass 202 to produce a reflected light thereof (light along a vertical optical axis) which is then deflected at an angle of 90 degrees by the first mirror 212 so as to be directed to the second mirror 216 of the second carriage 220. The first mirror 212 of the first carriage 214 directs the light which is irradiated from the above-mentioned transparent original light source unit 408 and then passes through the transparent original to the second mirror 216.

In the second carriage 220, a reflection surface of the second mirror 216 is disposed such that it is opposed to as well as in parallel to the above-mentioned first mirror 212. When received the light from the first mirror 212, the second mirror 216 deflects the received light at an angle of 90 degrees. Subsequently, the thus deflected light is further deflected at an angle of 90 degrees by the third mirror 218.

The light which was finally rendered parallel to the surface of the platen glass 202 by the third mirror 218 reaches the light-receiving portion of the line CCD sensor 230 by way of the fixing unit 228. The light-receiving portion of the line CCD sensor 230 of the present embodiment is composed of three lines which detect respective colors (R, G and B) separately as previously described with reference to FIG. 4B.

In the fixing unit 228, light quantity is adjusted by the diaphragm 222 and the ND filter of the cluster of filters 224 while color balance among respective colors is adjusted by a color adjusting filter of the cluster of filters 224. The original image is formed on the light-receiving surface of the line CCD sensor 230 by the lens 226. On a surface of a lens of the color adjusting filter, an IR cut film corresponding to the IR cut filter is vapor deposited.

The first carriage 214 and the second carriage 220 reciprocate in the auxiliary direction along the original plane under the platen glass 202. In this case, the second carriage is arranged to move at half the transport speed of the first carriage 214 in the same direction as that of the first carriage 214 so as to render the length of optical path from the original reflection (or transmittance) position to the light-receiving portion of the line sensor CCD sensor 230 to be always kept constant. One cycle (back-and-forth) of movement of the first carriage 214 and the second carriage 220 is equivalent to scanning for one image (the image is read while the carriage is moving forward.) whereby the original image on the platen glass 202 can be read.

The above-mentioned transparent original scanner unit 232 moves in the similar movement as the above-mentioned first carriage 214 by the driving force of a light source unit driver (not shown) therein. In other words, when the transparent original is scanned, the transparent original scanner unit 232 operates in synchronization with the first carriage 214. At this point of time, the reflection original light source unit 210 of the first carriage 214 is off while the halogen lamp of the transparent original light source unit in the transparent original scanner unit 232 is on whereby the transparent original image can be obtained by the first mirror 212. Operations thereof to be taken thereafter are similar to those of the reflection original.

It should be noted that the scanner unit in the invention is by no means limited to a type that relies upon the slit scan described above but that it may make use of areal exposure by which the entire surface of the image in one frame is read at a time. In this case, for example, an area CCD sensor is used, a means for inserting R, G and B color filters is interposed between the light source and the film F, and the image is read with the area CCD sensor by sequentially inserting the R, G and B color filters so as to separate the image recorded on the film F to the three primary colors.

Same is said with the reflection original reading scanner unit.

The results obtained by reading the transparent original (film) image with the above-described film scanning unit 10 and by reading the reflection and transparent original images with the scanner unit 200 are sent to the image processing apparatus 14 which will be described below.

Figure 5:
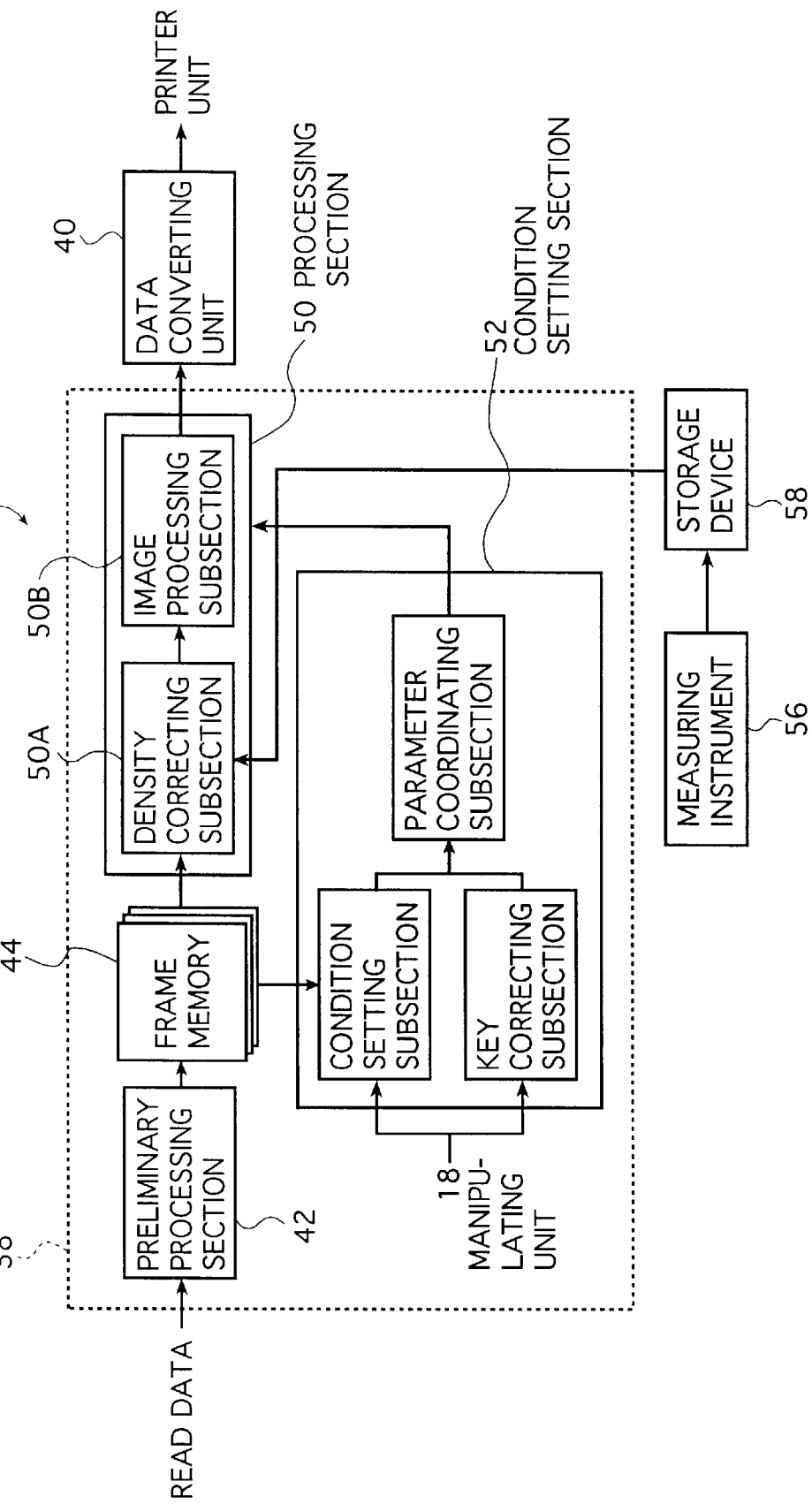
FIG. 5 is a block diagram illustrating an embodiment of an image processing apparatus in the film scanning unit shown in FIG. 3.

FIG. 5 is a schematic diagram showing the internal structure of the image processing apparatus 14. As shown also in FIG. 3, the image processing apparatus 14 comprises an image processing unit 38 and a data converting unit 40.

The image processing unit 38 comprises a preliminary processing section 42 composed of an A/D converter which performs A/D (analog/digital) conversion of the read image signals to be inputted, a data converting subsection which performs data conversions such as a negative/positive conversion or a dynamic range adjustment or the like of the image signals of the film read with the film-reading scanner unit (image reading unit 12), and a Log converting subsection which performs a logarithmic conversion and amplification and the like, each frame memory 44 corresponding to each of R, G and B, a processing section 50 which performs various kinds of image processing that will be described later and a condition setting section 52 which is in charge of setting various processing conditions to be employed in the processing section 50.

The above-mentioned condition setting section 52 selects an image processing to be performed, as well as sets an image processing condition at the processing section 50 by means of an image data inputted from the frame memory 44 thereby providing the thus set processing condition to the processing section 50.

The processing section 50 comprises a density correcting subsection 50A which is a feature of the present invention and an image processing subsection 50B which performs various kinds of conventional image processing.

It should be noted that FIG. 5 shows only sections related with image processing in the image processing apparatus 14 and, in the image processing apparatus 14, provided are other sections than the above-described sections such as a CPU which controls and manages the color digital printer 1 in its entirety including the image processing apparatus 14, a memory which stores the information necessary for the operation of the color digital printer 1 and so forth. Further, the manipulating unit 18 and the display 20 are connected to respective sections through the CPU and the like (CPU bus).

Moreover, to the image processing apparatus 14, connected is a storage device 58 in which a measured result (including a measured position and a measured value) of the reference original with a measuring instrument 56 such as a spectrophotometer which is one of features of the invention and from which the measured result is read to be supplied to the density correcting subsection 50A in the image processing apparatus 14. The storage device 58 may be a built-in memory or a external memory which is a memory or hard disk unit or a combination of a storing medium such as a magnetic recording medium, for example, a floppy disk (FD) or the like, a photomagnetic recording medium, for example, an MO, an optical recording medium, for example, an optical disc (CD, CD-R) or the like and the driving device thereof. It is preferable herein from the standpoint of handling convenience that the measured result is stored in the storing medium and read from the driving device into the density correcting subsection 50A whenever the need arises.

An ordinary operation of the color digital printer according to the present embodiment as constructed in the above-mentioned manner will now be described.

The image data supplied from the image reading unit 12, the scanner unit 200 or other image data supplying source R is subjected to a preset data processing such as an A/D (analog/digital) conversion, a Log conversion, a DC offset correction, a shading correction or the like at the preliminary processing section 42 of the image processing unit 38 in the image processing apparatus 14, further subjected to an image processing which will be described later and converted in the data converting unit 40 into either one or both of the image data corresponding to print production (image recording) at the above-described printer unit and the image data corresponding to image representation on the display 20.

In the color digital printer according to the present embodiment from the reason that the image to be reproduced as a print at the printer unit and the image to be represented on the display 20 can be rendered very close to each other and other reasons, it is preferable that a similar image data is subjected to the same processing in the image processing unit 38 for outputting to either of the above-mentioned printer unit or display 20 and subjected to conversion processing with conversion parameters corresponding to each of the printer unit and display 20 in the data converting unit 40.

In the image processing unit 38, as described above, the R, G and B image signals which are outputted from the image reading unit 12, the scanner unit 200 or other image data supplying section R are subjected to preliminary processing and then to corrections (density corrections) such as darkness correction, shading correction and the like in the density correcting subsection 50A so that preset image signals can be obtained from images having a prescribed density.

Subsequently, the image signals are subjected to a preset processing in the image processing subsection 50B, and made to output image signals corresponding to image recording with the printer unit or to the image data corresponding to image representation on the display 20 thereby being outputted into the printer unit or the display 20.

The printer unit exposes the light-sensitive material (photographic paper) in accordance with the supplied image data to record a latent image and then subjects the thus exposed light-sensitive material to preset processing at a processor unit to produce a print. The display 20 represents the image based on the supplied image data.

The image processing carried out in the above-mentioned image processing subsection 50B is not limited to any particular way, and various kinds of image processing executed in known image processing apparatuses are exemplified such as, for example, color balance adjustment, gradation adjustment, density adjustment, saturation adjustment, electronic magnification, dodging processing (compression/expansion of the dynamic range of densities), sharpness processing and the like. Each of these processing operations may be performed by a known means such as an LUT, a matrix operator, a filter, an adder and the like including a means of an appropriate combination of the above means such as an averaging processing, an interpolating operation or the like.

Next, the density characteristic correcting method according to the invention will be explained with reference to the color digital printer according to the present embodiment making use of a distinctive operation thereof, that is, an operation for obtaining a density characteristic correction parameter by the scanner.

In the following description, the density characteristic correcting method according to the invention will be described taking the reflection original reading scanner unit 200 as a representative example. However, the invention is not limited to this kind of scanner and it is of course without saying that the invention is applicable to the image reading unit 12 for the transparent original and a large transparent original reading scanner unit (scanner unit 200 having a light source device 400).

Figure 6A:
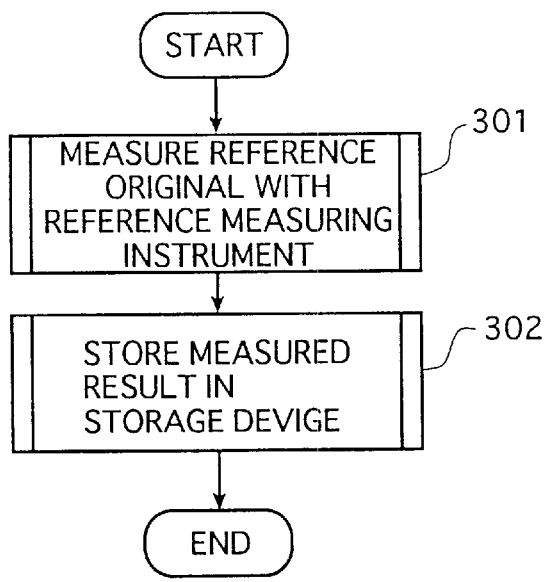
FIGS. 6A and 6B are flow charts showing schematically an example of an input density characteristic correction parameter calculating operation in a scanner according to an embodiment of the invention, respectively.
Figure 6B:
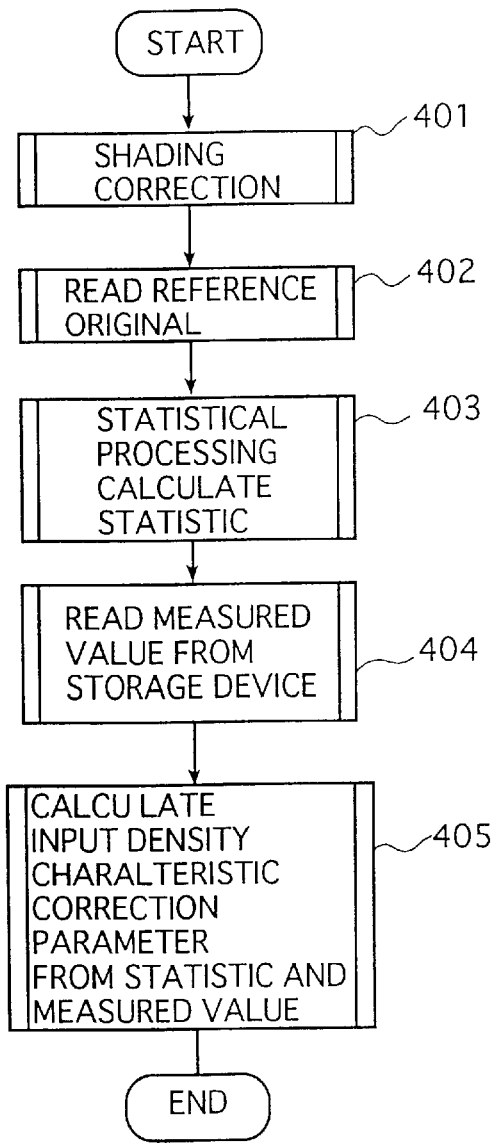

A flowchart of the operation is schematically shown in FIGS. 6A and 6B. First, as shown in FIG. 6A, the reference original is measured by the reference measuring instrument (56; see FIG. 5) (step 301) and the measured result (including measured value and position information thereof) is stored in the storage device (58; see FIG. 5) (step 302).

Secondly, as shown in FIG. 6B, after the shading correction is executed by the image reading unit which will be a target to be corrected, that is, the scanner unit 200 in FIG. 1 herein, the reference original is read (steps 401 and 402). Thereafter, being based on the thus measured result, a statistic such as a mean value, a median value or the like of the image signal values within the preset image region is obtained (step 403).

Almost at the same time with the above step, the measured result (reference measured value) of the reference original previously obtained by the reference measuring instrument 56 and stored in the storage device 58 is read out (step 404). From this measured result and the statistic obtained in the step 403, an input density characteristic correction parameter is calculated (step 405).

The operation shown in each of the above steps will now be described in detail. First, when measurement at the step 301 shown in FIG. 6A is performed, the reference original for creating the input density characteristic correction parameter is prepared and the image thereof is measured with the measuring instrument 56 such as a spectrophotometer which is capable of obtaining the reference data. The measured value is preferably spectral transmittance of the reference (transparent) original (spectral reflectance in case of the reflection reference original).

For example, the measured value is preferably status M density (printing density) in case of the density of the color negative film and status A density (colorimetric density) in case of the density of, for example, the color reversal film, the color positive film, the color print or the like. Moreover, the measured values may be of respective R, G and B values measured on the basis of the X, Y and Z colorimetric values. These measured values are preferably those which will be read by a reference inputting device.

As the reference original, those which have a spectrally flat characteristic, that is, ND filters of various densities in the case of the transparent original scanner or charts formed with patches of achromatic colors of various densities in the case of the reflection original scanner are illustrated. The reference original preferably includes a low density portion, for example, density of 0.2 or less. Moreover, it is preferable that it also includes high density portion; for example, density of 2.5 or more for the transparent original and 1.5 or more for the reflection original.

Moreover, the reference original may be one having a uniform density over all of the surface thereof or a plurality of different density portions on the surface thereof. Furthermore, the density characteristic correcting method according to the invention may be performed using one reference original or a plurality of reference originals. Particularly when the reference original with a uniform density over all of the surface thereof is used, it is preferable that a plurality of reference originals are used. In addition, when a plurality of reference originals are used, it is necessary that the reference original and the measured value to be stored in the storage device 58 are correlated or associated with each other. A method how to correlate them will be described later in the specification.

In the step 302 shown in FIG. 6A, the above-mentioned measured value is stored in the storage device 58. As the storage device 58, as described above, a known storing medium such as the flexible disk (floppy disk), the IC card or the like, or the driving device thereof can be employed.

Information to be stored in the storage device 58 is position information of respective points (they may be preset) on the reference original and image signals (measured values) corresponding to these position information. The above-mentioned position information designates, for example, positions within a region where the above-mentioned patches are formed in a chart which is the reference original.

Now, using the above-mentioned reference measured value, the input density characteristic correction parameter of the scanner or the like which will be the target to be corrected is calculated.

In the scanner unit 200, as shown in FIG. 6B, after the shading correction has been performed in a conventional method (step 401), the above-mentioned reference original is read (step 402); and the thus read data is converted into digital image signals by the A/D converter which are subsequently sent to the density correcting subsection 50A. At the same time, the reference original position information is also obtained.

The density correcting subsection 50A analyzes the image signals in a preset region of the reference original supplied from the supplied image signals of the reference original and calculates the statistic thereof (step 403). In the illustrated example, further as a preferred embodiment, the statistic is preferably provided after a difference derived from the measuring instrument 56 and the optical system of the scanner 12, specifically, a difference derived from flares and the like, is corrected.

The statistic is not particularly limited and a mean value, a median value, an integrated value or the like is preferably exemplified.

The density correcting subsection 50A reads out the above-mentioned reference measured value and the position information thereof from the storage device 58 (step 404). Subsequently, using the reference measured value and the previously calculated statistic, the input density characteristic correction parameter of the scanner 12 is calculated (step 405). At the same time, using the above-mentioned position information, the reference measured value is associated with it.

Now, a calculation method of the above-mentioned input density characteristic correction parameter will be described in detail.

The method of calculating the input density characteristic correction parameter using the reference measured value and the statistic is not particularly limited and various known methods can be used in accordance with the calculated statistic. However, the following method is exemplified as being preferable.

The density correcting subsection 50A compares the above-mentioned reference measured value with the statistic value and defines the difference therebetween as the input density characteristic correction parameter. The input density characteristic correction parameter comprising a linear matrix is illustrated. For example, from the following computing equations using luminance (Y):

$$Y=(R+G+B)/3 \qquad (1)$$

$$Y=0.11R+0.59G+0.30B \qquad (2)$$

and other computing equations, Y is obtained. From the statistic based on the obtained luminance Y and the above-mentioned reference measured value, an error minimizing operation or an error maximum likelihood operation is executed to form a correction parameter which will then be transformed into an LUT. When either of these operations is executed, a better result can be obtained by weighting while putting importance on a low density.

The above-mentioned error minimization operation can employ, for example, a least square method.

The input density characteristic correction parameter is created as a 3×4 matrix which shows a correction value of each color, that is, an LUT for operating the density correction value using the matrix.

In other words, for example, following relationship between an input R and an output R' exists:

$$R'=LUT_R (f_R (R, G, B)),$$

wherein following relation is established:

$$f_R (R, G, B)=\beta_0 R+\beta_1 G+\beta_2 B+\beta_3$$

Similar relations are found also between inputs G and B and outputs G' and B"respectively.

It is preferable that these input density characteristic correction parameters are previously created (calculated) in accordance with the respective original types and the read signals are corrected using the input density characteristic correction parameter in accordance with the original to be read.

For example, in a case of the image reading unit 12 which reads the film F as shown in FIG. 3, it is preferable that the input density characteristic correction parameter is previously created in accordance with each of the negative film and the reversal film.

In a case of the scanner unit 200 for the reflection original and the transparent original as shown in FIG. 2, it is preferable that the input density characteristic correction parameter in accordance with each of the photograph, the printed matter, the transparent original (film) and the like is previously created.

Moreover, the input density characteristic correction parameter does not need to be created (renewed) each time an image is read or each time the color digital printer 1 is started up. That is, it is sufficient to create a new input density characteristic correction parameter only when the color digital printer 1 is shipped from a factory or when parts which have possibility to change the spectral sensitivity (color separation) characteristic of the image reading unit 12 or the scanner unit 200 is replaced, exchanged or adjusted.

Specifically, a new input density characteristic correction parameter is created when the color digital printer 1 is shipped from the factory, when the reading light sources are replaced, when color filters which are disposed in an optical path are replaced while an image is read with the scanner unit, or when the color separation filters mounted on the image sensor 34 (respective color CCD sensors) are replaced.

In the invention, the spectral sensitivity characteristic of the image reading unit 12 or the scanner unit 200 is estimated using one reference original and, being based on the estimated spectral sensitivity characteristic, the input density characteristic correction parameter is created whereby unevenness of the spectral sensitivity of the scanner is preferably corrected to allow a high-quality image with constant color reproduction to be stably reproduced and the input density characteristic correction parameter in accordance with each of various types of originals to be created.

When digital image data is read, it is often subjected to A/D conversion at a high gradation resolution of 12 bits or the like and converted into image data corresponding to image processing of 8 bit or the like, for example, through the Log conversion. However, it is preferable from the view point of accuracy or the like to calculate the input density characteristic correction parameter and to correct the image signals by means of the thus calculated correction parameter using image signals (including the image data having been subjected to the Log conversion) which have a gradation resolution higher than that of the image data corresponding to the image processing executed in the image processing subsection 50B.

The input density characteristic correcting method according to the first aspect of the invention is not limited to the above-mentioned composite printing apparatus and it is widely applicable to the image processing apparatuses provided with the image reading apparatus (scanner) in general.

The method for correcting the density characteristic according to the first aspect of the invention is basically constituted as described above.

Next, a color correcting method according to a second aspect of the invention will now be described in detail with reference to FIGS. 7 to 9C.

Figure 7:
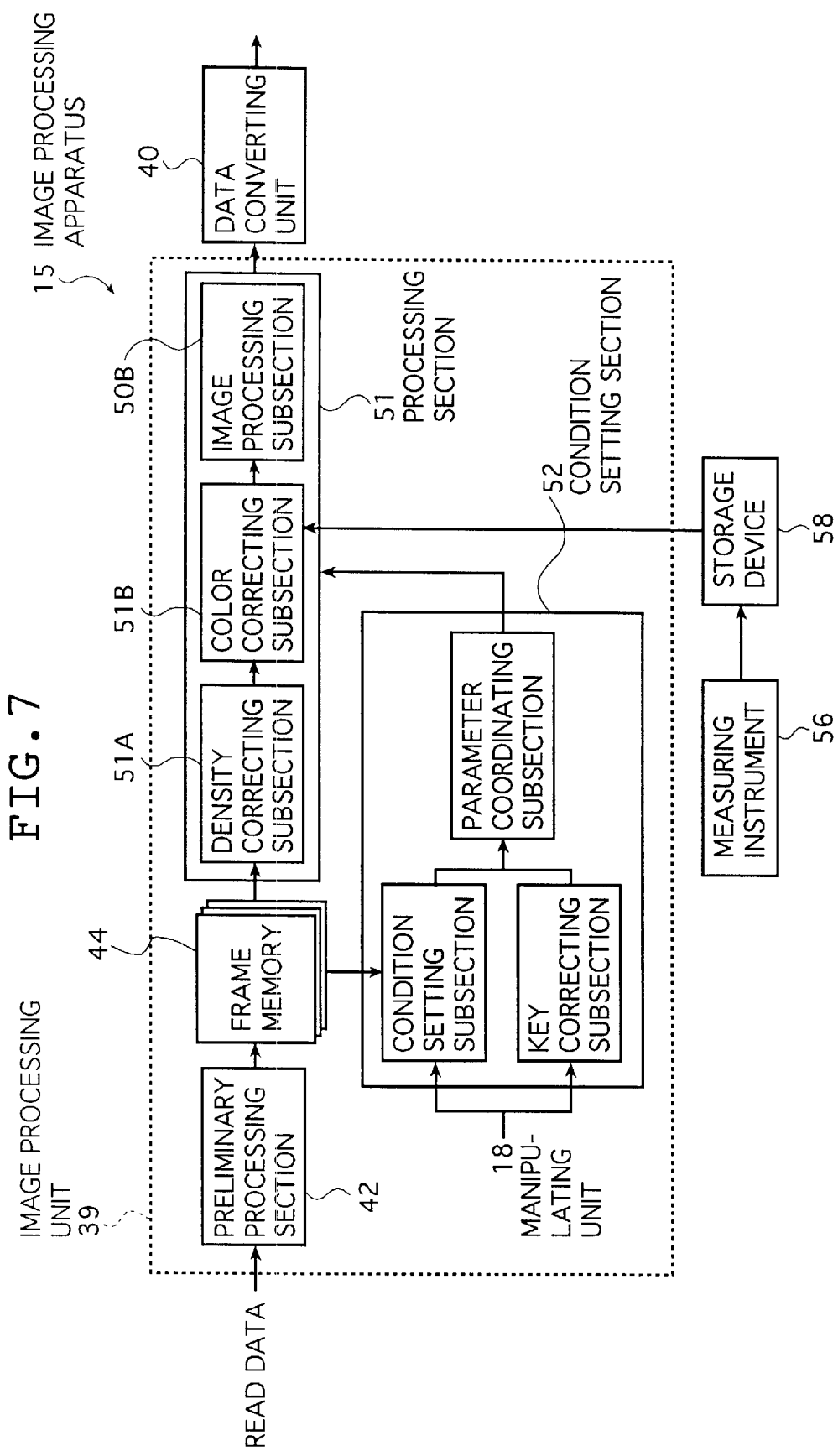
FIG. 7 is a block diagram illustrating another embodiment of the image processing apparatus in the film scanning unit shown in FIG. 3.

The color correcting method of the second aspect of the invention is to be performed using an image processing apparatus 15 as shown in FIG. 7 instead of the image processing apparatus 14 of the color digital printer 1 as shown in FIGS. 1 to 5. The image processing apparatus 15 as shown in FIG. 7 has the similar construction as that of the image processing apparatus 14 as shown in FIG. 5, except that the construction of a processing section 51 of an image processing unit 39 is different from that of the processing section 50 of the image processing unit 38. Therefore, a description on the similar functions and operations between them is omitted and the similar constituent elements between them are provided with the same numerals or characters thereby omitting detailed description thereof.

FIG. 7 schematically shows an internal structure of the image processing apparatus 15. As shown in FIG. 7, the image processing apparatus 15 comprises an image processing unit 39 and the data converting unit 40.

The image processing unit 39 comprises the above-mentioned preliminary processing section 42, the above-mentioned frame memory 44 corresponding to each of R, G and B, the processing section 51 for performing various kinds of image processing which will be described later, the condition setting section 52 which is in charge of setting various kinds of processing conditions to be used in the processing section 51.

The above-mentioned condition setting section 52 selects image processing to be performed, sets the image processing condition to be used in the processing section 51 employing the image data inputted from the frame memory 44 and outputs the thus set processing conditions to the processing section 51.

The processing section 51 comprises a density correcting subsection 51A and a color correcting subsection 51B which are characteristic to the invention, and the image processing subsection 50B which performs various kinds of conventional image processing.

In the large processing unit 39, respective R, G and B image signals inputted to the preliminary processing section 42 as previously described are subjected to the preliminary processing to be stored in each frame memory 44 of the associated color thereof. Thereafter, the R, G and B image signals subjected to the preliminary processing are read out from each frame memory 44 into the processing section 51. In the processing section 51, first, at the density correcting subsection 51A, the image with a constant density is subjected to a correction (density correction) such as a dark correction, a shading correction or the like so as to obtain a preset image signal and, secondly, at the color correcting subsection 51B, the thus density-corrected image signals are subjected to color correction processing which will be described later by the color correcting method of the second aspect of the invention.

Then, the color-corrected image signals are subjected to preset image processing at the image processing subsection 50B to produce either an output image data suitable for an image to be recorded by the printer unit which will then be outputted to the printer unit or an image data suitable for image representation on the display 20 which will then be outputted to the display 20.

The color correcting method of the second aspect of the invention will now be described with reference to the color digital printer 1 shown in FIGS. 1 to 4B and 7 making use of a distinctive operation thereof, that is, an operation for obtaining an input color correction parameter by the scanner. In the following description, the color correcting method according to the invention will be described taking the scanner unit 200 for reading the reflection original as a representative example. However, the invention is not limited to this kind of the scanner and it is of course without saying that the invention is applicable to the transparent original reading scanner (image reading unit) 12 and a large transparent original reading scanner unit (scanner unit 200 having a light source device 400).

Figure 8A:
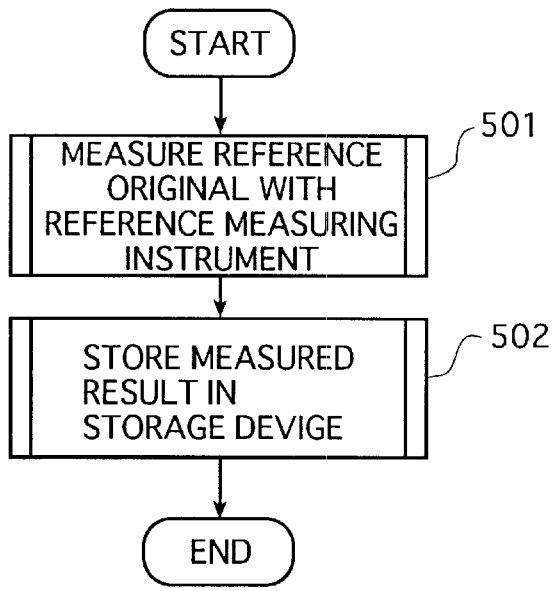
FIGS. 8A and 8B are flow charts showing schematically an example of an input color correction parameter calculating operation in a scanner according to another embodiment of the invention.
Figure 8B:
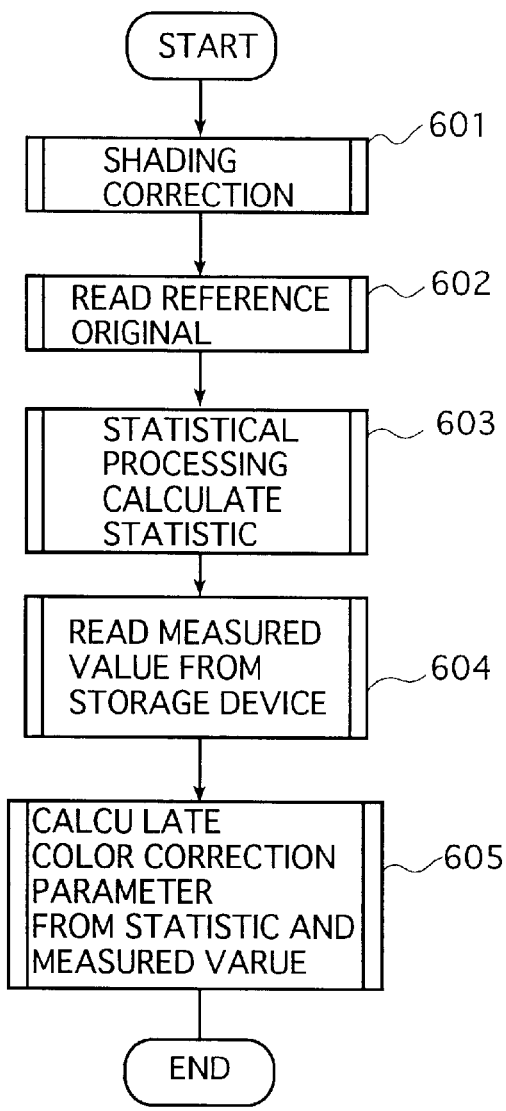

Flowcharts of the operations are schematically shown in FIGS. 8A and 8B. First, as shown in FIG. 8A, the reference original is measured with the reference measuring instrument 56 (step 501) and the measured result is stored in the above-mentioned storage device 58 (step 502).

Secondly, as shown in FIG. 8B, the shading correction is executed by the image reading apparatus which will be a target to be corrected, that is, the scanner unit 200 in FIG. 1 herein and then the reference reflection original is read (steps 601 and 602). Thereafter, being based on the thus measured result, a statistic such as a mean value, a median value or the like of the image signal values within the preset image region is obtained (step 603).

Almost at the same time with the above step, the measured result (reference measured value and position information thereof) of the reference original previously obtained by the reference measuring instrument 56 and stored in the storage device 58 is read (step 604). From this measured result and the statistic obtained in the step 603, an input color correction parameter is calculated (step 605).

Operations shown in the above respective steps will now be described in detail. First, when measurement at the step 501 as shown in FIG. 8A is performed, the reference original for creating (calculating) the input color correction parameter is prepared and the image thereof is measured with the measuring instrument 56 such as a spectrophotometer which is capable of obtaining the reference data. The measured value is preferably spectral reflectance of the reference (reflection) original (spectral transmittance in case of the reference transparent original).

For example, the measured value is preferably status M density in case of the density of the color negative film and status A density in case of the density of, for example, the color reversal film, the color positive film, the color print or the like. Moreover, the measured values may be of respective R, G and B values measured on the basis of the X, Y and Z colorimetric values. These measured values are preferably those which will be read by a reference inputting device.

As the reference original herein, any one is available if the spectral sensitivity of the scanner can be measured. It includes, for example, a reference original formed wither with patches of various kinds of hues or with patches of various kinds of saturation or achromatic colors of various densities where, for example, a Macbeth chart, a color target of ANSI or the like is illustrated.

Moreover, as the reference original, any one which corresponds to a target to be read is preferably used: a reference negative original when a negative film is read; a reference reversal original when a reversal film is read; a reference photographic original when a photographic original is read; a reference printed original when a printed original is read.

Furthermore, as the reference measuring instrument 56, as described above, the reference input device such as a drum scanner unit which strictly controls color separation filters or the like is exemplified.

In the step 502 as shown in FIG. 8A, the above-mentioned measured value is stored in the storage device 58. As the storage media 58, as described above, known storage media, for example, a flexible disk (floppy disk), and IC card and the like and a driving device thereof can be used.

Information to be stored in the storage device 58 are position information of respective points (they may be preset) on the reference original and image signals (measured values) corresponding to these position information. The above-mentioned position information designates, for example, positions within a region where the above-mentioned patches are formed in the chart which is the reference original.

Now, using the above-mentioned reference measured value, the color correction parameter of the scanner which will be the target to be corrected is calculated. As described above, the case of reading the reflection original with the scanner unit 200 will now be described with reference to FIG. 8B.

In the scanner unit 200, after the shading correction has been performed in a conventional method (step 601), the above-mentioned reference original is read (step 602); the thus read data is converted into digital image signal by the A/D converter which is subsequently subjected to density correction processing at the density correcting subsection 51A; and the resultant image signal is supplied to the color correcting subsection 51B. At the same time, the reference original position information is also obtained.

The color correcting subsection 51B analyzes the image signals in the preset region of the reference original from the supplied image signals of the reference original and calculates the statistic thereof (step 603). In the illustrated example, further as a preferred embodiment, the statistic is preferably provided after a difference derived from the measuring instrument 56 and the optical system of the scanner unit 200, specifically, a difference derived from flares or the like is corrected.

The statistic is not particularly limited and a mean value, a median value, an integrated value or the like is preferably exemplified.

The color correcting subsection 51B reads out the above-mentioned reference measured value and the position information thereof from the storage device 58 (step 604). Subsequently, using the read-out reference measured value and the previously calculated statistic, the input color correction parameter of the scanner unit 200 is calculated (step 605). At this time, using the above-mentioned position information, the reference measured value is associated with it.

Now, a calculation method of the above-mentioned input color correction parameter at the above-mentioned step 605 will be described in detail.

The method of calculating the input color correction parameter through the reference measured value and the statistic is not particularly limited and various known methods can be also used in accordance with the calculated statistics. However, in the invention the following method is exemplified as being preferable.

In the apparatus of the illustrated embodiment, a plurality of input color correction parameter candidates (hereinafter called as candidate parameters) in accordance with the spectral sensitivity characteristic of the scanner unit 200 are previously set. As to each of the above-mentioned candidate parameters, the color correcting subsection 51B calculates the image signal which is estimated (hereinafter called as read estimated value) as being obtainable by the scanner unit 200 through reading the reference original after this color correction is performed and then calculates the statistic of the image signal.

As already mentioned, the statistic calculated from the image signal actually obtained by reading the reference original with the scanner unit 200 and the statistic calculated from the above-mentioned read estimated value are compared. Thereafter, the candidate parameter which has obtained the statistic having the least error is designated as an input color correction parameter candidate of the scanner unit 200. Subsequently, the correction parameter which will allow the error amount to be generated from the selected above candidate to be minimum is calculated and, then, the selected color correction parameter candidate and the error correction parameter obtained through the calculation are combined to create (calculate) one parameter.

As the input color correction parameter, illustrated are a parameter obtained by combining at least one of a linear matrix, a quadratic matrix and a three-dimensional LUT (lookup table) obtained by expanding the quadratic matrix, a parameter including a one-dimensional LUT in addition to the above-mentioned parameters as described later, another three-dimensional LUT obtained by combining the three-dimensional LUT with the one-dimensional LUT and the like.

For example, if the above-mentioned color correction parameter candidate is a quadratic matrix coefficient and the error correction parameter is a linear matrix coefficient, a color correction parameter created by combining these matrices becomes a quadratic matrix. This color correction parameter of the quadratic matrix is expanded by the CPU into a three-dimensional LUT (lookup table) which will then be used as the color correction parameter.

FIGS. 9A, 9B and 9C show examples of internal structures of the color correcting subsection 51B having the above-mentioned functions.

As shown in FIG. 9A, the color correcting subsection 51B basically comprises a 3×10 matrix 51B-1 showing a quadratic matrix as an example of a plurality of candidate parameters previously set, a linear 3×4 matrix 51B-2 as an example of matrices which correct an error to be generated when a candidate parameter selected from the above plurality of candidate parameters is used and an LUT 51B-3 for calculating the color correction value when both of these parameters are used.

As shown in FIG. 9B, the above 3×10 matrix 51B-1 and the 3×4 matrix 51B-2 are allowed to be combined to create a three-dimensional LUT 51B-4.

Furthermore the thus created three-dimensional LUT 51B-4 and the LUT 51B-3 for calculating the correction value are allowed to be combined to create a new three-dimensional LUT 51B-5 as shown in FIG. 9C.

When the content of the above three-dimensional LUT 51B-5 shown in FIG. 9C is illustrated, the following relation exists between an input R (and inputs G and B) and an output R':

$R'=LUT_r(f_R(R, G, \text{ and } B))$, wherein following relation is established:

$$f_R(R, G, B) = \alpha_0 R + \alpha_1 G + \alpha_2 B +$$
$$\alpha_3 R^2 + \alpha_4 G^2 + \alpha_5 B^2$$
$$+ \alpha_6 RG + \alpha_7 GB + \alpha_8 BR + \alpha_9$$

The similar relations are also established between the inputs G and B and the associated outputs G' and B' respectively.

Moreover, besides the correction by the above-mentioned color correction parameter, it is capable of increasing the accuracy of correction such that the achromatic colors within the above mentioned reference originally are only targeted and the one-dimensional LUT is calculated to absorb the error of the correction value created by both of the original measured value and the correction parameter calculated in the above step.

As an LUT calculation means to be used in this case, it is illustrated that a polynomial approximation expression is calculated and an approximation coefficient is used as a parameter.

The above-mentioned correction which targets only the portion of the achromatic color may be performed either before the color correction or after the color correction. Moreover, the one-dimensional LUT for correcting only the above-mentioned portion of the achromatic color as a target and the previously mentioned three-dimensional LUT (51B-5) for performing the color correction are allowed to be combined to create another three-dimensional LUT.

It is preferably that these input color correction parameters are previously created in accordance with the respective original types and, in the color correcting subsection 51B, the image signal is corrected using the input color correction parameter in accordance with the original to be read.

For example, in a case of the image reading unit 12 which reads the film F as shown in FIG. 3, it is preferable that the input color correction parameter is previously created in accordance with each of the negative film and the reversal film and, further preferably, previously created in accordance with each of film makers, grades and film types.

In a case of the scanner unit 200 for the reflection original and the transparent original as shown in FIG. 2, it is preferably that the input color correction parameter in accordance with each of the photograph, the printed matter, the transparent original (film) and the like, further preferably, in accordance with each of the photographic paper (photographic light-sensitive material), each of the printing factory and the like.

Moreover, the input color correction parameter does not need to be created (renewed) each time an image is read or each time the color digital printer 1 is started up. That is, it is sufficient to create a new input color correction parameter only when the color digital printer 1 is shipped from a factory or when parts which have possibility to change the spectral sensitivity (color separation) characteristic of the image reading unit 12 or the scanner unit 200 is replaced, exchanged or adjusted.

Specifically, a new input color correction parameter is created when the color digital printer 1 is shipped from the factory, when the reading light sources are replaced or exchanged, when color filters which are disposed in an optical path are replaced or exchanged while an image is read with the scanner, or when the color separation filters mounted on the image sensor (respective color CCD sensors) are replaced or exchanged.

In the above description, as a preferred embodiment, the input color correction parameter is calculated using the image signals which have been subjected to the density correction in the density correcting subsection 51A. However, the invention is not limited thereto and, for example, the color correcting subsection 51B may be disposed before (upstream of) the density correcting subsection 51A.

In the invention, the spectral sensitivity characteristic of the image reading unit 12 or the scanner unit 200 is estimated using one reference original and, being based on the thus estimated spectral sensitivity characteristic, the input color correction parameter is created whereby unevenness of the spectral sensitivity of the scanning is preferably corrected to allow a high-quality image with constant color reproduction to be stably reproduced and the input color correction parameters in accordance with various types of originals to be created.

When digital image is read, it is often subjected to A/D conversion at a high gradation resolution of 12 bits or the like and converted into image data corresponding to image processing of 8 bit or the like, for example, through the Log conversion. However, it is preferable from the view point of accuracy or the like to calculate the input color correction parameter and to correct the image signals by means of the thus calculated parameter using image signals (including the image data having been subjected to the Log conversion) which have a gradation resolution higher than that of the image data corresponding to the image processing executed in the image processing subsection 50B.

In the invention, the image signals include the image data which have not been subjected to the Log conversion. Therefore, the color correcting subsection 51B may be disposed upstream of the Log converting section so that the above processing steps may be performed using the image data which has not been subjected to the Log conversion.

Moreover, in the invention, by replacing the density correcting subsection 51A as shown in FIG. 7 into the density correcting subsection 50A as shown in FIG. 5, both of the density characteristic correcting method of the first aspect of the invention and the color correcting method of the second aspect of the invention may be performed. In this case, it is optimal and preferable for an appropriate color reproduction that, after the density characteristic correction according to the invention has been performed in the density correcting subsection 50A, the color correction according to the invention is performed in the color correcting subsection 51B. However, the invention is by no means limited thereto. Moreover, in this case, the reference original such as the Macbeth chart or the color target of ANSI or the like which can be put for common use may be employed. However, it is preferable from the standpoint of the correction accuracy that the reference original most suitable to each case is selected.

The color correcting method according to the invention is not limited to the above-mentioned composite printing apparatus and it is widely applicable to image processing apparatuses having an image reading apparatus (scanner) as a whole.

The method for correcting the color according to the second aspect of the invention is basically constituted as described above.

The example described above creates a correction parameter such as either of or both of the input density characteristic correction parameter and the input color correction parameter using one reference original. The invention, however, is not limited thereto and the correction parameter can be created using a plurality of reference originals. In this case, it is necessary that respective reference originals and measured results thereof (including measured values and measured position information) are correlated (associated) with each other. A method how to correlate them in the density characteristic correcting method and the color correcting method is exemplified as follows:

A first method is applied when the number of the reference original and the order thereof to be used are previously determined. At first, the measured result obtained by the measuring instrument 56 of each of the reference originals is stored in the storage device 58 in the predetermined number and order (steps 301 and 302 in FIG. 6A or steps 501 and 502 in FIG. 8A). Next, the measured result is read from the storage device 58 in the predetermined order (step 404 in FIG. 6B or step 604 in FIG. 8B), as well as the statistic is obtained by reading the corresponding reference original by the scanner (for example, scanner unit 200) in the predetermined order (steps 401 to 403 in FIG. 6B or steps 601 to 603 in FIG. 8B). Thus obtained statistic and the corresponding read measured result are subsequently accumulated. After the statistic and the measured result of each of a preset number of the reference originals are obtained, the correction parameter is calculated (step 405 in FIG. 6B or step 605 in FIG. 8B).

A second method is applied as in the similar way as in the above-mentioned first method in which the order to be used, number and corresponding measured result of the reference original are previously determined. In this method, at first, as similarly as in the first method, the number of a plurality of reference originals, the order thereof to be used and the measured results corresponding to these reference originals are stored in the storage device 58. The plurality of reference originals to be used and the order thereof to be used are represented (displayed) on a display 20 to be notified outside, that is, to an operator. Thereafter, as in the similar way as in the first method, the measured result is read; the statistic is calculated; and the measured result and statistic are accumulated; hence the correction parameter is calculated after the preset number of the measured result and statistic are accumulated.

A third method is applied when the number of the reference original to be used in previously determined as one and the order thereof to be used is provided in a plural numbers or when a plurality of sets of the reference originals whose number and order to be used are previously determined are provided. In this method, the number of the plurality of the reference originals to be used, the order to be used and a plurality of measured results corresponding to the reference originals are previously stored in the storage device 58. The order to be used of a plurality of the reference originals or the number and order to be used of the plurality of the reference originals are read with a control device. Thereafter, as similarly as in the second method, a plurality of the reference originals and the order thereof to be used are represented on the display 20, or, in other words, represented to show which reference originals are used, and are notified outside, that is, to the operator. Then, as in the similar way as in the second method, the correction parameter is calculated.

A fourth method is applied when a relationship between a plurality of the reference originals which are capable of being used and measured results corresponding to these reference originals are stored. In this method, a plurality of the reference originals and the measured results corresponding to these reference originals are correlated with each other to be stored in the storage device 58. By means of obtaining information on the reference original to be used, for example, automatically setting information on the reference original to be used with a control device disposed in the apparatus or inputting it from outside (operator) with a information inputting device, the measured result corresponding to the reference original to be used is read out from the storage device 58. On the other hand, as in the similar way as in the way described above, statistic is obtained by reading the reference original to be used with the scanner. The thus obtained statistics and the corresponding read-out measured results are sequentially accumulated. After the preset number of the statistics and measured results are accumulated or after an indication for calculation of the correction parameter is inputted from outside, for example, the operator with the information inputting device, the correction parameter is calculated from the stored statistic and measured result.

Moreover, when a plurality of reference originals are said, correlation or correspondence between each of these reference originals and the measured result thereof is previously provided to the reference original as a bar code; and thereafter this bar code is read with a bar code reader to read out the measured result corresponding to this read bar code from the storage device 58.

Furthermore, information representing the corresponding measured result is previously recorded on a portion of the reference original using at least one of a numeral, a patch density, a pattern and the bar code; thereafter, at the same time when the reference original is read with the scanner, the information on the measured result is read as an image information; then the read image information (the read information on the measured result) is analyzed and judged; hence, the corresponding measured result may be read out.

Still furthermore, information indicating the corresponding measured result as well as presence or absence of calculation of the correction parameter is previously recorded on a portion of the reference original using at least one of a numeral, a patch density, a pattern and the bar code; thereafter, at the same time when the reference original is read with the scanner, the information on the measured result and the presence or absence of the calculation of the correction parameter are read as an image information; then the read image information is analyzed and judged to read out the corresponding measured result and presence or absence of calculation of the correction parameter; hence, the corresponding measured result may be accumulated in case of absence of calculation of the correction parameter as well as the correction parameter may be calculated in case of presence of calculation of the correction parameter.

While the density characteristic correcting method of the first aspect of the invention an the color correcting method of the second aspect of the invention have been described in detail through various examples, it should be noted that the invention is by no means limited to the foregoing embodiments and various improvements and modifications may of course be made without departing from the scope and spirit of the invention.

As described above in detail, according to the density characteristic correcting method of the first aspect of the invention, when the image is photoelectrically used, the unevenness of various kinds of characteristics of the scanner can be corrected and the density characteristic correction which will be a basis of performing an appropriate color reproduction corresponding to the original image can be performed so that a high-quality image can be stably reproduced in the color digital printer or the like.

As described above in detail, according to the color correcting method of the second aspect of the invention, when the image is photoelectrically read, unevenness of the spectral sensitivities of the scanner can be preferably corrected whereby images of high quality in which appropriate colors are reproduced can be stably reproduced in a color digital printer or the like.

Moreover, in a case that the density characteristic correcting method according to the first aspect of the invention and the color correcting method according to the second aspect of the invention are performed at the same time, when the image is photoelectrically read, unevenness of various kinds of characteristics of the scanner is corrected; density characteristic correction which will be the basis of performing an appropriate color reproduction in accordance with the original image can be executed; at the same time, unevenness of the spectral sensitivity of the scanner can be preferably corrected; hence, in the color digital printer or the like, the high-quality image whose color and density are appropriately reproduced can be stably reproduced.

What is claimed is:

1. A method for correcting density characteristic comprising:
   a first step of measuring a reference original with a preset measuring instrument to obtain a measured result and storing the thus obtained measured result in a storing means;
   a second step of reading said reference original with an image reading apparatus which is a target to be corrected and obtaining a statistic by analyzing image signal values in a preset position within an image region of the reference original;
   a third step of reading out the measured result stored in said storing means; and
   a fourth step of calculating an input density characteristic correction parameter from the statistic obtained by said second step and the measured result read by the third step.

2. The density characteristic correcting method according to claim 1, wherein a shading correction parameter is created before reading in said second step is performed and wherein said shading correction parameter is used when the reading in said second step is performed.

3. The density characteristic correcting method according to claim 1, wherein image signal values obtained by measuring the reference original with the preset measuring instrument and a position information thereof are stored in said storing means as the measured result.

4. The density characteristic correcting method according to claim 1, wherein said input density characteristic correction parameter is a lookup table which is determined such that an error between the measured result obtained in said first step and the statistic obtained in the second step is minimized.

5. The density characteristic correcting method according to claim 1, wherein a plurality of reference originals are used as said reference original.

6. The density characteristic correcting method according to claim 5, further comprising the steps of:
   determining a number and an order to be used of said plurality of reference originals previously;

storing measured results corresponding to said plurality of reference originals in said storing means in the thus previously determined number and order to be used;

reading out said measured result corresponding to the reference original from said storing means in said previously determined order to be used;

obtaining said statistic by reading said corresponding reference original with said image reading apparatus in said previously determined order to be used;

accumulating sequentially the thus obtained statistic and said read corresponding measured result in said previously determined order; and calculating said input density characteristic correction parameter after said statistics and said measured results relative to said previously determined number of the reference originals are obtained.

7. The density characteristic corresponding method according to claim 6, wherein said plurality of reference originals to be used and the order thereof to be used are displayed to be notified outside before said reference originals are used.

8. The density characteristic correcting method according to claim 5, further comprising the steps of:

storing a number and an order to be used of said plurality of reference originals, and measured results corresponding to these plurality of reference originals in said storing means previously;

reading out said number and said order to be used of said plurality of reference originals with a control means;

displaying said plurality of reference originals to be used and the order thereof to be used to be notified outside;

reading out said measured result corresponding to the reference original from said storing means in said order to be used;

obtaining said statistic by reading said corresponding reference original with said image reading apparatus in said order to be used;

accumulating sequentially the thus obtained statistic and said read corresponding measured result in said order to be used; and calculating said input density characteristic correction parameter after said statistics and said measuring results relative to said read-out number of the reference originals are obtained.

9. The density characteristic correcting method according to claim 5, further comprising the steps of:

storing measuring results corresponding to said plurality of reference originals in said storing means in which the measured results are correlated with said reference originals;

obtaining an information of the reference original to be used;

reading out the measured result corresponding to the reference original from said storing means;

obtaining said statistic by reading said reference original to be used with said image reading apparatus;

accumulating sequentially the thus obtained statistic and said read-out corresponding measured result; and calculating said input density characteristic correction parameter from said accumulated statistics and said accumulated measured results.

10. The density characteristic correcting method according to claim 9, wherein said information of said reference original to be used is inputted from outside with a information inputting means and wherein said input density characteristic correction parameter is calculated based on a calculating instruction of said input density characteristic correction parameter which is inputted with said information input means from outside.

11. The density characteristic correcting method according to claim 5, wherein said reference original is provided with a bar code to be read with a bar code reader and wherein said measured result corresponding to the thus read bar code is read out from said storing means.

12. The density characteristic correcting method according to claim 5, wherein an information representing said measured result corresponding to the reference original is recorded on a portion of said reference original using at least one of a numeral, a patch density, a pattern and a bar code, wherein said information on the measured result is read as an image information at the same time when said reference original is read with said image reading apparatus, and wherein said thus read image information is analyzed and judged to read out said corresponding measured result.

13. The density characteristic correcting method according to claim 5, wherein an information representing said measured result corresponding to the reference original as well as a presence or absence of a calculation of said input density characteristic correction parameter is recorded on a portion of said reference original using at least one of a numeral, a patch density, a pattern and a bar code, wherein said information on the measured result as well as the presence or absence of the calculation of said input density characteristic correction parameter is read as an image information at the same time when said reference original is read with said image reading apparatus, wherein said thus read image information is analyzed and judged to read said corresponding measured result as well as the presence or absence of said calculation, and wherein said corresponding measured result is accumulated when said calculation is absent while said input density characteristic correction parameter is calculated when said calculation is present.

14. A method for correcting color comprising:

a first step of measuring a reference original with a preset measuring instrument and then storing the thus obtained measured result in a storing means;

a second step of reading said reference original with an image reading apparatus which is a target to be corrected and obtaining a statistic by analyzing image signal values in a preset position within an image region of the reference original;

a third step of reading out the measured result stored in said storing means; and a fourth step of calculating an input color correction parameter from the statistic obtained in said second step and the measured result read in the third step.

15. The color correcting method according to claim 14, wherein a shading correction parameter is created before reading in said second step is performed and wherein said shading correction parameter is used when the reading in said second step is performed.

16. The color correcting method according to claim 14, wherein an input density correction parameter is created for an original which spectrally has an approximately constant reflectance or transmittance before reading with said image reading apparatus in said second step is performed and wherein the thus created input density correction parameter is employed when reading in said second step is performed.

17. The color correcting method according to claim 14, wherein image signal values obtained by measuring said reference original with the present measuring instrument and a position information thereof are stored in said storing means as the measured result.

18. The color correcting method according to claim 14, wherein calculation of the input color correction parameter in said fourth step comprises the steps of:
    selecting a parameter which has a smallest error from among previously obtained candidate parameters;
    calculating a correction parameter which minimizes an amount of an error to be generated from the thus selected parameter; and
    combining the selected parameter and the thus calculated correction parameter.

19. The color correcting method according to claim 14, wherein, as said reference original, a same kind of reference original as that of the original which is the target to be read is used.

20. The color correcting method according to claim 14, wherein, as said reference original, a plurality of reference originals are used.

21. The color correcting method according to claim 20, further comprising the steps of:
    determining a number and an order to be used of said plurality of reference originals previously;
    storing measured results corresponding to said plurality of reference originals in said storing means in the thus previously determined number and order to be used;
    reading out said measured result corresponding to the reference original from said storing means in said previously determined order to be used;
    obtaining said statistic by reading said corresponding reference original with said image reading apparatus in said previously determined order to be used;
    accumulating sequentially the thus obtained statistic and said read corresponding measured result in said previously determined order; and
    calculating said input color correction parameter after said statistics and said measured results relative to said previously determined number of the reference originals are obtained.

22. The color correcting method according to claim 21, wherein said plurality of reference originals to be used and the order thereof to be used are displayed to be notified to outside before said reference originals are used.

23. The color correcting method according to claim 20, further comprising the steps of:
    storing a number and an order to be used of said plurality of reference originals, and measured results corresponding to these plurality of reference originals in said storing means previously;
    reading out said number and said order to be used of said plurality of reference originals with a control means;
    displaying said plurality of reference originals to be used and the order thereof to be used to be notified outside;
    reading out said measured result corresponding to the reference original from said storing means in said order to be used;
    obtaining said statistic by reading said corresponding reference original with said image reading apparatus in said order to be used;
    accumulating sequentially the thus obtained statistic and said read corresponding measured result in said order to be used; and
    calculating said input color correction parameter after said statistics and said measured results relative to said read-out number of the reference originals are obtained.

24. The color correcting method according to claim 20, further comprising the steps of:
    storing measured results corresponding to said plurality of reference originals in said storing means in which the measured results are correlated with said reference originals;
    obtaining an information of the reference original to be used;
    reading out the measured result corresponding to the reference original from said storing means;
    obtaining said statistic by reading said reference original to be used with said image reading apparatus;
    accumulating sequentially the thus obtained statistic and said read-out corresponding measured result; and
    calculating said input color correction parameter from said accumulated statistics and said accumulated measured results.

25. The color correcting method according to claim 24, wherein said information of said reference original to be used is inputted from outside with a information inputting means and wherein said input color correction parameter is calculated based on a calculating instruction of said input color correction parameter which is inputted with said information input means from outside.

26. The color correcting method according to claim 20, wherein said reference original is provided with a bar code to be read with a bar code reader and wherein said measured result corresponding to the thus read out bar code is read out from said storing means.

27. The color correcting method according to claim 20, wherein an information representing said measured result corresponding to the reference original is recorded on a portion of said reference original using at least one of a numeral, a patch density, a pattern and a bar code, wherein said information on the measured result is read as an image information at the same time when said reference original is read with said image reading apparatus, and wherein said thus read image information is analyzed and judged to read out said corresponding measured result.

28. The color correcting method according to claim 20, wherein an information representing said measured result corresponding to the reference original as well as a presence or absence of calculation of said input color correction parameter is recorded on a portion of said reference original using at least one of a numeral, a patch density, a pattern and a bar code, wherein said information on the measured result as well as the presence or absence of the calculation of said input color correction parameter is read as an image information at the same time when said reference original is read with said image reading apparatus, wherein said thus read image information is analyzed and judged to read said corresponding measured result as well as the presence or absence of said calculation, and wherein said corresponding measured result is accumulated when said calculation is absent while said input color correction parameter is calculated when said calculation is present.

29. The method of claim 1, wherein the reference original measured by the preset unit is the same reference original read by the target image reading apparatus.

30. The method of claim 1, wherein the statistic of the image signal values comprises at least one of: an average value, a median value and an integrated value of the image signal value.

31. The method of claim 14, wherein the reference original measured by the preset unit is the same reference original read by the target image reading apparatus.

32. The method of claim 14, wherein the statistic of the image signal values comprises at least one of: an average value, a median value and an integrated value of the image signal value.

* * * * *

UNITED STATES PATENT AND TRADEMARK OFFICE
CERTIFICATE OF CORRECTION

PATENT NO. : 6,480,625 B1
DATED : November 12, 2002
INVENTOR(S) : Yoshirou Yamazaki It is certified that error appears in the above-identified patent and that said Letters Patent is hereby corrected as shown below:

Column 25,
Line 18, delete "corresponding" and insert -- correcting --;
Line 44, delete "measuring" and insert -- measured --; and
Line 49, delete "measuring" and insert -- measured --.

Signed and Sealed this

Twentieth Day of May, 2003

JAMES E. ROGAN
*Director of the United States Patent and Trademark Office*